(12) United States Patent
Soleng et al.

(10) Patent No.: US 8,423,303 B2
(45) Date of Patent: Apr. 16, 2013

(54) METHOD FOR REAL TIME MEASUREMENT OF MASS FLOW RATE OF BULK SOLIDS

(75) Inventors: Per Soleng, Hareid (NO); Per Huse, Ålesund (NO)

(73) Assignee: Rolls-Royce Marine AS, Brattvaag (NO)

(*) Notice: Subject to any disclaimer, the term of this patent is extended or adjusted under 35 U.S.C. 154(b) by 994 days.

(21) Appl. No.: 12/377,118

(22) PCT Filed: Aug. 16, 2007

(86) PCT No.: PCT/NO2007/000283
§ 371 (c)(1),
(2), (4) Date: Feb. 26, 2009

(87) PCT Pub. No.: WO2008/020762
PCT Pub. Date: Feb. 21, 2008

(65) Prior Publication Data
US 2010/0241368 A1    Sep. 23, 2010

(30) Foreign Application Priority Data
Aug. 17, 2006    (NO) .................................. 20063698

(51) Int. Cl.
*G01F 1/34*    (2006.01)
(52) U.S. Cl.
USPC .............. 702/47; 702/45; 702/50; 73/861.04
(58) Field of Classification Search .................. 702/47, 702/45, 50; 406/10; 73/861.04
See application file for complete search history.

(56) References Cited

U.S. PATENT DOCUMENTS

| 4,506,541 A | 3/1985 | Cunningham |
| 5,132,917 A * | 7/1992 | Bass ............................... 702/45 |
| 6,601,458 B1 * | 8/2003 | Gysling et al. ............. 73/861.04 |

FOREIGN PATENT DOCUMENTS

| EP | 0454230 A2 | 10/1991 |
| EP | 0974816 A1 | 1/2000 |
| JP | 1316613 A | 12/1989 |

OTHER PUBLICATIONS

International Search Report, dated Nov. 29, 2007, issued in International Application No. PCT/NO2007/000283.
Written Opinion of the International Searching Authority, dated Nov. 29, 2007, issued in International Application No. PCT/NO2007/000283.

* cited by examiner

*Primary Examiner* — Jonathan C Teixeira Moffat
*Assistant Examiner* — Hien Vo
(74) *Attorney, Agent, or Firm* — Klarquist Sparkman, LLP

(57) ABSTRACT

The mass flow rate of bulk solids in a pneumatic transport system is measured in real time. At least two pressure gauges (P1, P2) are provided in a pipe section of the transport system. The pressure drop ΔP between the pressure gauges is determined during a gas-solids flow of air and bulk solids through the pipe section. The suspension density $\rho_{sus}$ of the flowing mixture of air and bulk solids is calculated. The bulk solids mass flow rate $M_s$ at a given location along a given length of a pipeline is estimated based at least on the suspension density $\rho_{sus}$ of the flowing mixture.

5 Claims, 1 Drawing Sheet

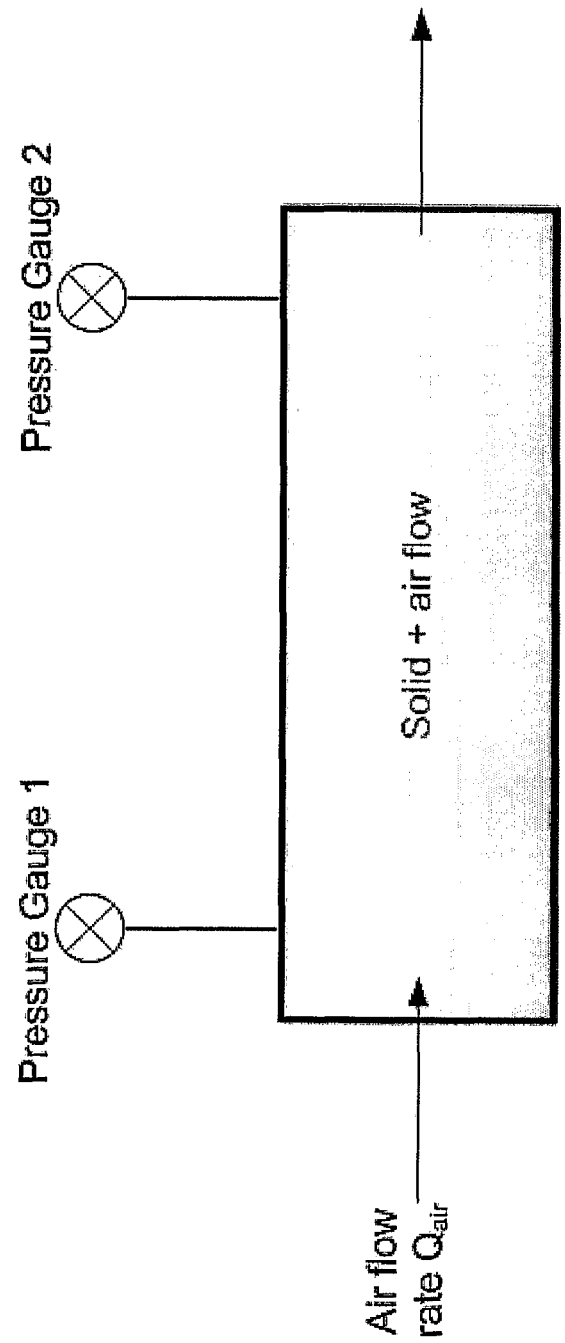

METHOD FOR REAL TIME MEASUREMENT OF MASS FLOW RATE OF BULK SOLIDS

The present invention relates to a method for real time measurement of mass flow rate of bulk solids, in where said bulk solids are loaded, or unloaded, by a pneumatic transport system.

The technique is based on measurement of airflow rate and the pressure drop at a given location over a given length of pipeline during pneumatic conveying of bulk materials. The technique also utilizes the predetermined pressure drop coefficient of the bulk materials during conveying.

The object is thus to provide an easy, accurate and economical method for estimating cumulative mass flow of a bulk material, such as cement, when loading or unloading said material from for example a bulk ship.

U.S. Pat. No. 6,601,458 B1 discloses a principle of a multiphase flow meter, which measures the flow rate of fluid mixture and also the proportions of each of the fluids. The instrument needs the measurement of: Temperature, pressure, speed of sound in the fluids, and bulk velocity. The instrument uses a model to calculate the flow rate of the fluid mixture based on the above measurements. Said method can only be used for fluid systems. The method uses at least four different measured parameters to make such calculations, and needs sensors at a plurality of locations along the pipeline. Further, there is no indication that it can measure the flow rate of particles. This is in contrary to the present invention, which only needs pressure data and airflow rate data.

U.S. Pat. No. 4,506,541 disclose an apparatus for measuring the bulk density of pulverised coal or similar other material entrained in air along a duct using radiation source and by detecting the scattered radiation. The radiation detector measures the diffused radiation scattered by the particles, which gives a measurement of the flow bulk density. It uses electrical charge of two electrodes in the path of coal particle flow and cross-correlation technique to calculate the speed of the particles inside the pipeline. The velocity thus measured together with the bulk density give the mass flow rate of the solids.

U.S. Pat. No. 4,506,541 is in contrary to the present invention in that said patent uses radiation source, detector and a shield to intercept direct radiation falling on the detector. The radiation detector measures the diffused radiation scattered by the particles, which gives a measurement of the flow bulk density. The above in association with a pair of electrodes are used for measurement of velocity. Further, the instrument needs calibration on a bench scale rig before it can be used. At site it shall again need further calibration. According to the present invention, there is no need for calibration neither at site nor on bench scale rig, and radiation source is not used.

EP 974816 A1 discloses a method and device for measuring a flow of granular solid materials, in where the mass flow rate of material circulating in a conduit using fluid under pressure, is measured by an acoustic signal generated in the conduit. The pressure difference is calculated based on the intensity of said acoustic signal.

Further, U.S. Pat. No. 6,176,647 B1 discloses a device for measuring mass flow rate of powder, in where pressure is measured in two places and the differential pressure is estimated.

There is further known flow meter used for measuring flow of liquids based on the differential pressure across a venturi. This can only be used for fluid flow measurement, and the present invention is not using any venture or any other type of obstruction in the flow field.

BRIEF DESCRIPTION OF THE DRAWING

FIG. 1. is a schematic diagram of a pipe section and two spaced-apart pressure gauges.

DETAILED DESCRIPTION

The invention shall be described in further detail, as example, by the enclosed FIGURE, which shows a principle schematics of the invention.

The present invention relates particularly to an estimation method for mass flow rate of bulk solids. In a preferred embodiment of the invention, two or more pressure gauges are placed at a preferred location in a pipeline of a pneumatic transport system. Such a transport system can for instance be used for loading or unloading of a bulk material, such as cement or similar material, from or to a cargo hold of a ship.

In the method according to the invention, at least two measuring devices are arranged in a pipe section of the transport system, then to read the difference in the measured values from said at least two measuring devices, as the gas-solids flow of air and bulk solids takes place, and thereafter to estimate the bulk solids mass flow rate $M_s$ at a given location over a given length of a pipeline of the flowing mixture.

Different measuring devices can be used, such as pressure gauges, accelerometers, acoustic sensors, etc. In the following, formulas for using pressure gauges are shown as an example for carrying out the method according to the invention. However, it should be noted that when using accelerometers, acoustic sensors, etc., other formulas are used then the below examples.

In a preferred embodiment of the invention, two or more pressure gauges are, for example, placed approximately 2 m apart in any given location in a pipeline to the transport system, and the pressure drop is measured when the gas-solids flow takes place. The pressure gauges preferable used are standard in stock equipment and will thus not be further described, as they must be regarded as known by a man skilled in the art.

The pressure drop in such gas-solids flow is given by:

$$\Delta P = \frac{1}{2} K \frac{\rho_{sus} L V^2}{D} \quad (1)$$

Where; $\Delta P$ is the pressure drop between pressure gauge 1 and 2.

K is the coefficient of friction of the bulk solid flowing through the pipeline. This is predetermined from tests.

$\rho_{sus}$ is the suspension density of the flowing mixture.

The suspension density is defined as:

$$\rho_{sus} = \frac{M_s + M_{air}}{Q_s + Q_{air}} \quad (2)$$

Where; $M_s$ is the solids mass flow rate.

$M_{air}$ is the air mass flow rate.

$Q_s$ is the solids volume flow rate at the section 1 and $Q_s = M_s/\rho_s$.

$Q_{air}$ is the air volume flow rate at the section 1.

D is the pipe diameter.

L is the length of the pipe section between pressure gauge P1 and P2.

V is the local air velocity at the section where the pressure gauge P1 is mounted.

The value of V can be calculated by using the airflow rate $Q_{air}$ and the local air pressure at pressure gauge P1.

Now since, V, L, D, K and ΔP are known at any instant, it is possible to calculate the value of the suspension density, i.e. $\rho_{sus}$.

Now since the values of $Q_{air}$ and hence $M_{air}$ are known, it is possible to calculate the value of mass flow rate of solids by writing:

$$V_s = \frac{M_s}{\rho_s} \quad (3)$$

where; $\rho_s$ is the solids density, which is known from laboratory measurement from before.

This can be calculated in real time to get mass flow of bulk solids and hence the cumulative mass flow of solids through a preferred section of choice. Thus, mass flow of for instance cement can be monitored in real time at any given location in the transport system. Several systems can be located in different places in the transport system to monitor vital part of the system, such as for example inflow and outflow openings. The results from the measurement can be stored in a storage disk in a computer, and the calculations and estimations of both real time and cumulative values are preferable also carried out be means of a computer. Thus, it is possible to control the airflow rate in real time based on the results from the method to control the mass flow rate of bulk material.

The invention claimed is:

1. A method for real time measurement of mass flow rate of bulk solids, wherein said bulk solids are loaded, or unloaded, by a pneumatic transport system having a pipe section along which are located at least two spaced-apart pressure gauges (P1,P2), the method comprising:

Determining pressure drop ΔP between said pressure gauges based on information provided by the pressure gauges during gas-solids flow of air and bulk solids through the pipe section, by a computing device, calculating suspension density $\rho_{sus}$ of the flowing mixture of air and bulk solids based on the pressure drop ΔP, and by a computing device, estimating the bulk solids mass flow rate $M_s$ at a given location along a given length of a pipeline, based at least on the calculated suspension density $\rho_{sus}$ of the flowing mixture, wherein said suspension density $\rho_{sus}$ of the flowing mixture is calculated using the following formula:

$$\Delta P = \frac{1}{2} K \frac{\rho_{sus} L V^2}{D} \quad (1)$$

where K is the coefficient of friction of the bulk solid flowing through the pipeline, D is the pipe diameter, L is the length of the pipe section between pressure gauges (P1, P2), V is the local air velocity at the section where the first pressure gauge (P1) is arranged.

2. A method according to claim 1, wherein said suspension density $\rho_{sus}$ is defined as:

$$\rho_{sus} = \frac{M_s + M_{air}}{Q_s + Q_{air}} \quad (2)$$

where $M_s$ is the solids mass flow rate, $M_{air}$ is the air mass flow rate, $Q_s$ is the solids volume flow rate at the section 1 and $Q_s = M_s/\rho_s$, $Q_{air}$ is the air volume flow rate at the section 1;

wherein the mass flow rate of bulk solids is estimated by:

$$V_s = \frac{M_s}{\rho_s} \quad (3)$$

where $\rho_s$ is the solids density.

3. A method according to claim 1, further comprising calculating cumulative mass flow of solids through a pipe section of the pneumatic transport system based on the mass flow of bulk solids as estimated in real time.

4. A method according to claim 3, wherein said bulk solids is dry cement or similar material.

5. A method according to claim 1, further comprising controlling the airflow rate based on the values from the measurements to control the mass flow rate of bulk material.

* * * * *